C
US008842552B2

(12) United States Patent
Olgaard et al.

(10) Patent No.: US 8,842,552 B2
(45) Date of Patent: Sep. 23, 2014

(54) METHOD OF FACILITATING TESTING OF MULTIPLE TIME-DIVISION-DUPLEX (TDD) DATA PACKET SIGNAL TRANSCEIVERS

(71) Applicant: Litepoint Corporation, Sunnyvale, CA (US)

(72) Inventors: Christian Volf Olgaard, Saratoga, CA (US); Wing Hung Lee, Saratoga, CA (US); Guang Shi, San Jose, CA (US); Sang Yui Hon, Cupertino, CA (US)

(73) Assignee: Litepoint Corporation, Sunnyvale, CA (US)

( * ) Notice: Subject to any disclaimer, the term of this patent is extended or adjusted under 35 U.S.C. 154(b) by 141 days.

(21) Appl. No.: 13/716,573

(22) Filed: Dec. 17, 2012

(65) Prior Publication Data

US 2014/0169181 A1 Jun. 19, 2014

(51) Int. Cl.
| | |
|---|---|
| *H04L 12/26* | (2006.01) |
| *H04W 24/02* | (2009.01) |
| *H04W 74/00* | (2009.01) |
| *H04L 1/16* | (2006.01) |
| *H04L 1/18* | (2006.01) |

(52) U.S. Cl.
CPC ............ *H04W 24/02* (2013.01); *H04W 74/006* (2013.01); *H04L 1/1671* (2013.01); *H04L 1/1812* (2013.01)
USPC ........... 370/242; 370/449; 370/468; 370/329; 375/267; 375/224

(58) Field of Classification Search
None
See application file for complete search history.

(56) References Cited

U.S. PATENT DOCUMENTS 6,069,884 A * 5/2000 Hayashi et al. ............... 370/335

| | | | |
|---|---|---|---|
| 6,393,023 B1 | 5/2002 | Shimizu et al. | |
| 6,650,629 B1 * | 11/2003 | Takahashi et al. | 370/335 |
| 6,721,302 B1 * | 4/2004 | Alastalo | 370/346 |
| 7,681,101 B2 | 3/2010 | Oran et al. | |

(Continued)

FOREIGN PATENT DOCUMENTS

| | | |
|---|---|---|
| EP | 1560383 | 8/2005 |
| EP | 2330864 | 6/2011 |
| WO | 93-23947 | 11/1993 |

OTHER PUBLICATIONS

International Search Report and Written Opinion Dated Nov. 11, 2013 for PCT Application No. PCT/US2013/069430.

(Continued)

*Primary Examiner* — Ian N Moore
*Assistant Examiner* — Dung B Huynh
(74) *Attorney, Agent, or Firm* — Vedder Price, P.C.

(57) ABSTRACT

Method and system for facilitating testing of multiple time-division-duplex (TDD) data packet signal transceivers. Replicas of a data packet signal are transmitted by a tester to multiple TDD devices under test (DUTs), where the replicated signal is either a null or TDD data packet signal. In one embodiment, replica null data packet signals are transmitted for a predetermined time interval sufficient for the DUTs to synchronize with the tester. In another embodiment, following successful and unsuccessful receptions of responsive signals from respective DUTs indicating successful reception of their respective replica TDD data packet signals and, therefore, synchronization with the tester, corresponding replica TDD data packet signals are provided with data packet signal characteristics causing such replica data packet signals to fail to conform or to conform, respectively, with a predetermined data packet signal standard. Following synchronization, test and responsive data packet signals can be exchanged between the tester and DUTs.

10 Claims, 6 Drawing Sheets

(56) References Cited

U.S. PATENT DOCUMENTS

| | | |
|---|---|---|
| 7,940,663 B2 | 5/2011 | Kadous |
| 2002/0111178 A1* | 8/2002 | Park ............................. 455/507 |
| 2003/0032445 A1 | 2/2003 | Suwa |
| 2003/0039219 A1* | 2/2003 | Kwak ........................... 370/320 |
| 2003/0063655 A1* | 4/2003 | Young ........................... 375/132 |
| 2005/0047393 A1* | 3/2005 | Liu ............................... 370/352 |
| 2005/0122990 A1* | 6/2005 | Parys ............................ 370/449 |
| 2007/0041464 A1* | 2/2007 | Kim et al. ..................... 375/267 |
| 2007/0086403 A1* | 4/2007 | Hatakeyama et al. ........ 370/338 |
| 2007/0153760 A1* | 7/2007 | Shapira ......................... 370/350 |
| 2007/0177567 A1 | 8/2007 | Parys |
| 2008/0232254 A1* | 9/2008 | Chhaya et al. ................ 370/236 |
| 2008/0280631 A1* | 11/2008 | Lee et al. ....................... 455/458 |
| 2009/0180464 A1 | 7/2009 | Walley et al. |
| 2010/0029325 A1* | 2/2010 | Wang et al. ................ 455/553.1 |
| 2010/0182987 A1* | 7/2010 | Shin et al. ..................... 370/338 |
| 2012/0195265 A1 | 8/2012 | Kim et al. |

OTHER PUBLICATIONS

U.S. Appl. No. 13/716,369, "System and Method for Parallel Testing of Multiple Data Packet Signal Transceivers" filed Dec. 17, 2012, Christian Volf Olgaard et al.

International Search Report and Written Opinion in PCT/US2013/069212 issued on Mar. 11, 2014, 12 pages.

* cited by examiner

METHOD OF FACILITATING TESTING OF MULTIPLE TIME-DIVISION-DUPLEX (TDD) DATA PACKET SIGNAL TRANSCEIVERS

BACKGROUND

The present invention relates to testing of data packet signal transceivers, and in particular, to systems and methods for parallel testing of multiple such devices.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such devices, engineers take extraordinary care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal analyzer (VSA) for analyzing signals produced by the device, and a vector signal generator (VSG) for generating signals to be received by the device. The analyses performed by the VSA and the signals generated by the VSG are generally programmable so as to allow each to be used for testing a variety of devices for adherence to a variety of wireless technology standards with differing frequency ranges, bandwidths and signal modulation characteristics.

Among the wireless technologies being tested are those where the transmitters and receivers of the devices operate on the same frequency. One such operation is time-division-duplex (TDD), with one increasingly common example known as Bluetooth. When performing simultaneous testing of two or more such devices employing TDD technologies, there is a possibility of error caused during testing due to variations in the start times of the devices. For example, in one scenario, one or more devices may synchronize to a response data packet generated by another device under test (DUT) rather than responding to the intended test data packet generated by the tester (e.g., by the VSG). As a result, a DUT that becomes synchronized to the wrong signal will remain so and, therefore, produce erroneous or invalid test results.

Accordingly, a method for synchronizing multiple TDD DUTs that avoids such improper synchronization scenarios would advantageously reduce faulty device synchronization and test time, and thereby reduce overall testing costs on a per device basis.

SUMMARY

In accordance with the presently claimed invention, a method and system are provided for facilitating testing of multiple time-division-duplex (TDD) data packet signal transceivers. Replicas of a data packet signal are transmitted by a tester to multiple TDD devices under test (DUTs), where the replicated signal is either a null or TDD data packet signal. In one embodiment, replica null data packet signals are transmitted for a predetermined time interval sufficient for the DUTs to synchronize with the tester. In another embodiment, following successful and unsuccessful receptions of responsive signals from respective DUTs indicating successful reception of their respective replica TDD data packet signals and, therefore, synchronization with the tester, corresponding replica TDD data packet signals are provided with data packet signal characteristics causing such replica data packet signals to fail to conform or to conform, respectively, with a predetermined data packet signal standard. Following synchronization, test and responsive data packet signals can be exchanged between the tester and DUTs.

In accordance with an exemplary embodiment of the presently claimed invention, a method of facilitating testing of multiple time-division-duplex (TDD) data packet signal transceivers includes:

providing a plurality of outgoing data packet signals for a plurality of TDD data packet signal transceivers, wherein each one of said plurality of outgoing data packet signals corresponds to a common data packet signal comprising at least one of a null data packet signal, and a TDD data packet signal with a data packet signal characteristic;

when said common data packet signal comprises a null data packet signal, continuing to provide said plurality of outgoing data packet signals for a predetermined time interval; and when said common data packet signal comprises a TDD data packet signal, responding to successful and unsuccessful receptions of respective ones of a plurality of responsive signals from said plurality of TDD data packet signal transceivers by providing one or more of said plurality of outgoing data packet signals, wherein each one of said plurality of responsive signals is indicative of a successful reception of a valid data packet by a corresponding one of said plurality of TDD data packet signal transceivers, and following a successful reception of one of said plurality of responsive signals from a corresponding one of said plurality of TDD data packet signal transceivers, a corresponding one of said plurality of outgoing data packet signals is provided with said data packet signal characteristic such that said corresponding one of said plurality of outgoing data packet signals fails to conform with a predetermined data packet signal standard, and following an unsuccessful reception of one of said plurality of responsive signals from a corresponding one of said plurality of TDD data packet signal transceivers, a corresponding one of said plurality of outgoing data packet signals is provided with said data packet signal characteristic such that said corresponding one of said plurality of outgoing data packet signals conforms with said predetermined data packet signal standard.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

In accordance with exemplary embodiments of the presently claimed invention, a method is provided for testing TDD devices simultaneously while avoiding improper tester-DUT synchronization. In one exemplary embodiment, using a test system, or tester, capable of replicating VSG signals simultaneously for sending to multiple TDD devices, and a demultiplexing subsystem for receiving response signals from the multiple TDD devices using a single VSA, the VSG sends sets of null data packets to the multiple TDD devices until a predetermined synchronization time interval has elapsed. This synchronization time interval is chosen to allow properly operating TDD devices to become ready for testing. Once this synchronization time interval has elapsed, the tester can begin sending sets of predefined test data packets to the devices and begin receiving response data packets from the devices, or, alternatively, the TDD devices can begin sending sets of predefined test data packets to the tester and receiving response data packets from the tester.

In another exemplary embodiment, the tester replicates the VSG signal for simultaneous transmission to multiple TDD devices and imparts signal characteristic control such that individual data packet signals can be corrupted so as to make them non-receivable by their corresponding TDD devices, e.g., by reducing the power level of a replicated VSG signal below a threshold level. Also included is a multiplexing subsystem for receiving the response signals from the multiple TDD devices for conveyance to the VSA of the tester, and for detecting reception of null data packets from the devices and communicating with the signal characteristic control subsystem for controlling the power levels of the respective replicated VSG signals.

As discussed in more detail below, the tester sends a set of replicated predefined synchronization data packets to the multiple TDD devices. Those devices ready to receive such data packets respond by returning null data packets. The tester detects which devices have returned such null data packets and communicates the status of returned and non-returned null data packets to the signal characteristic control subsystem. As a result, subsequent sets of the predefined synchronization data packets are sent to the TDD devices as before, but those synchronization data packets being sent to the TDD devices that have identified their readiness for testing by returning a null data packet are corrupted (e.g., by markedly reducing signal power following initiation of the data packet transmission and prior to termination of data packet transmission). Meanwhile, the replicated data packets sent to those TDD devices that had not yet identified their readiness for testing by sending a null data packet are transmitted in accordance with the applicable signal standard, i.e., they are not corrupted. As a result, those TDD devices that are not yet ready for testing continue to receive synchronization data packets until they do indicate readiness for testing, and, therefore, will not improperly synchronize to responsive null data packets generated by another DUT indicating its readiness for testing, since the DUTs that are ready for testing are receiving corrupted data packets and will, therefore, produce no responsive null data packets. Once all DUTs have indicated their readiness for testing by having replied with a null data packet, synchronization is complete and the tester may now begin sending predefined test data packets to and receiving responsive data packets from the DUTs, or, alternatively, the DUTs can begin sending sets of predefined test data packets to and receiving response data packets from the tester.

Exemplary embodiments of the presented claimed invention are discussed below in the context of a testing environment in which a single tester is used for testing multiple devices under test (DUTs). In the particular examples discussed, the testing environment includes three DUTs. However, it should be readily understood that the testing of three DUTs is merely exemplary and that the presently claimed invention can be practiced for any multiple (i.e., two or more) of DUTs.

Figure 1:
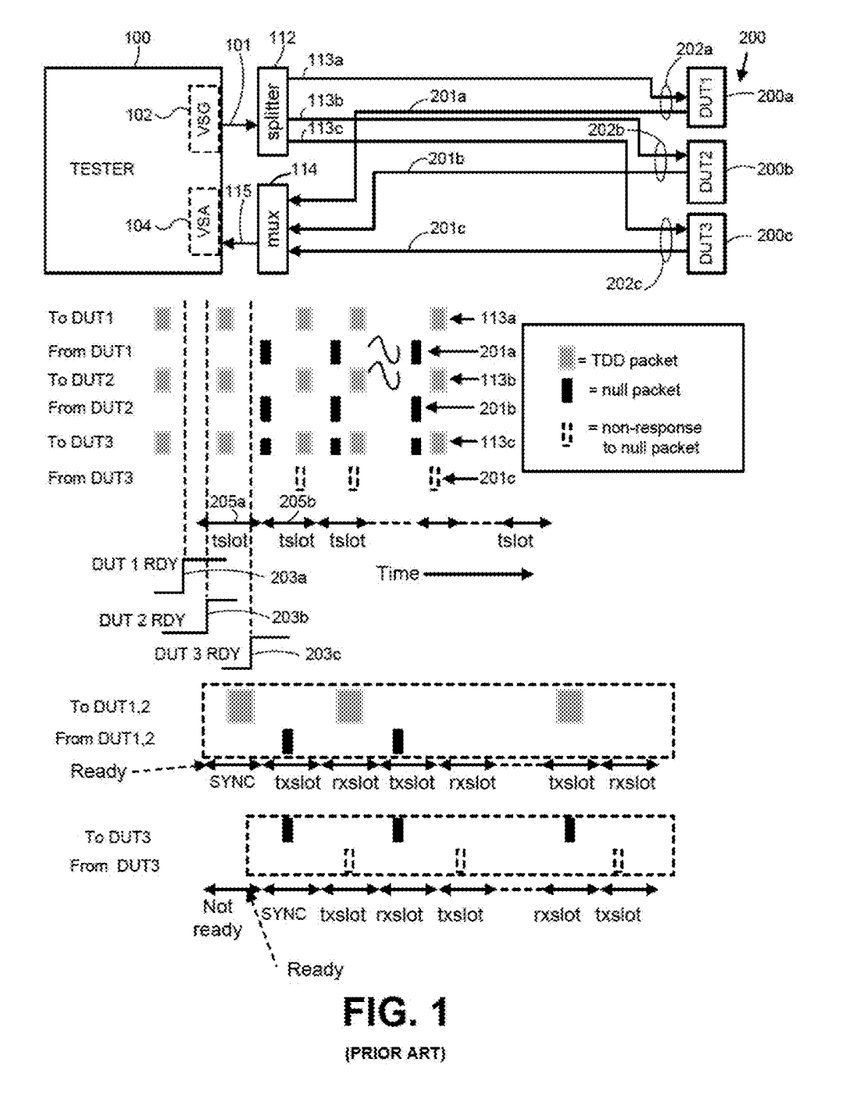
FIG. 1 depicts a conventional test environment for testing multiple DUTs in parallel.

Referring to FIG. 1, a conventional testing environment includes a test system, or "tester", 100 for testing multiple DUTs 200, e.g., three DUTs 200a, 200b, 200c. The tester 100 includes a VSG 102 and VSA 104 for providing a VSG test signal 101 and receiving a multiplexed DUT signal 115, respectively. Also included is signal routing or replication circuitry 112 (e.g., a power splitter) for replicating the VSG signal 101 to provide multiple replicated VSG signals 113a, 113b, 113c for the DUTs 200. The responsive signals 201a, 201b, 201c from the DUTs 200 are conveyed to the VSA 104 via additional signal routing circuitry 114, e.g., a multiplexor, which can be controlled by one or more control signals (not shown) provided by the tester 100 or an external controller (not shown).

As will be readily appreciated by one of ordinary skill in the art, and as discussed in more detail below, the respective signal paths for the replicated VSG signals 113a, 113b, 113c and responsive DUT signals 201a, 201b, 201c are shared, e.g., a single wired signal path is used to convey a test signal 113a/113b/113c to a DUT 200a/200b/200c and also convey the DUT signals 201a/201b/201c.

In accordance with well known principles, the testing system begins transmitting the replicated VSG signals 113a, 113b, 113c and, at various subsequent points in time, the various DUTs 200a, 200b, 200c become ready for testing and indicate such readiness by responding with a null data packet. In this example, the first DUT 200a is the first one to become ready 203a for testing, followed soon thereafter by the second DUT 200b becoming ready for testing 203b. Accordingly, after a first time slot 205a the first 200a and second 200b DUTs transmit responsive null data packets, thereby indicating their respective states of readiness for testing. However, when the third DUT 200c is finally ready for testing 203c, the first signal it sees is an attenuated version of one of the response null data packets from one of the other DUTs 200a, 200b (e.g., due to some form of signal leakage). However, since the third DUT 200c is expecting to receive a TDD data packet, but instead receives an attenuated null data packet, its responsive signal 201 c does not indicate readiness by the third DUT 200c for testing. Hence, while the other DUTs 200a, 200b have properly synchronized with the tester 100 and are properly responding to TDD data packets 113a, 113b with responsive null data packets 201 a, 201b, the third DUT 200c, though ready for testing, is improperly synchronized with a leaked null data packet signal instead of its TDD data packet signal 113c.

Figure 2:
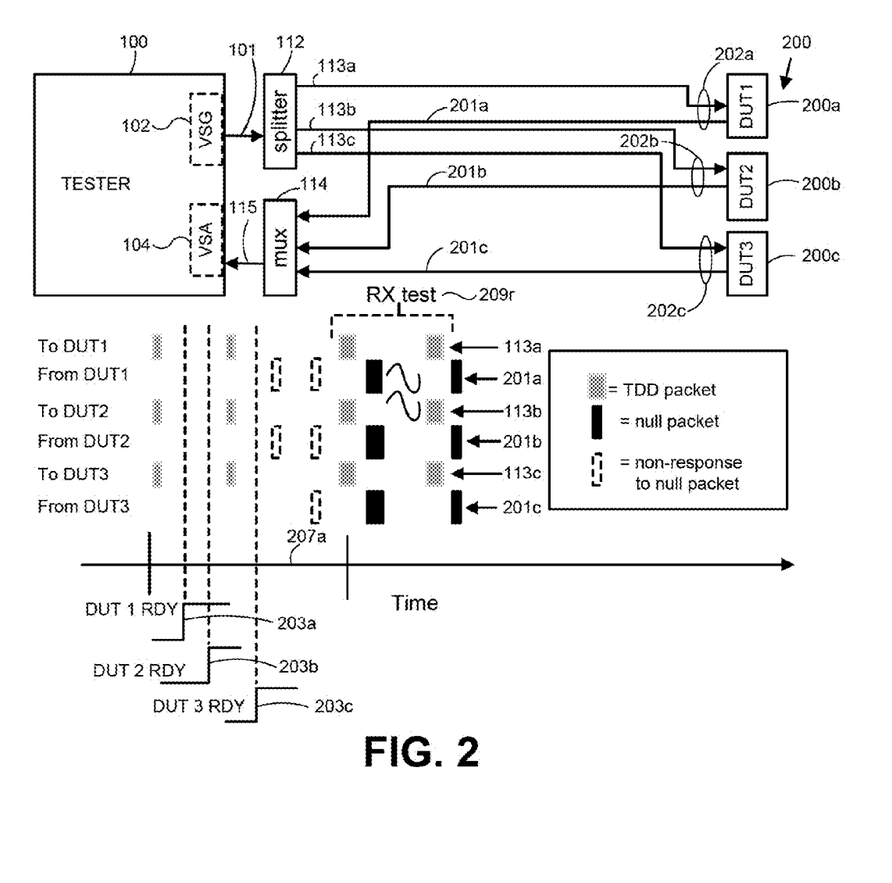
FIG. 2 depicts a testing environment for testing multiple DUTs in parallel in accordance with an exemplary embodiment of the presently claimed invention.

Referring to FIG. 2, in accordance with an exemplary embodiment of the presently claimed invention, VSG 102 provides a VSG signal 101 containing sets of null data packets during a predetermined synchronization time interval 207a. During this time interval 207a, the DUTs 200a, 200b, 200c receive a number of the replicated null data packets 113a, 113b, 113c and become ready for testing 203a, 203b, 203c. Though now ready for testing, the null data packets 113a, 113b, 113c from the tester 100 evoke no responses 201a, 201b, 201c from the DUTs 200a, 200b, 200c. Following this time interval 207a, the tester 100 can begin sending predefined test data packets during a receive test interval 209r, in response to which the DUTs 200a, 200b, 200c return null data packet signals 201a, 201b, 201c. Alternatively, the DUTs 200a, 200b, 200c can begin sending sets of test data packets to the tester 100 and receive responsive data packets from the tester 100 in return (not shown).

Figure 3:
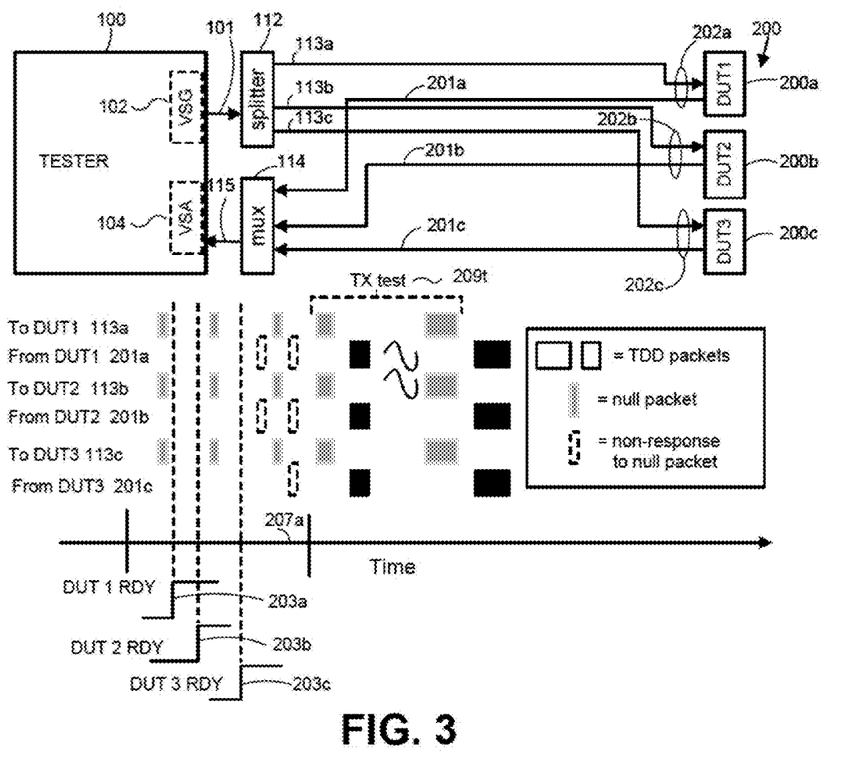
FIG. 3 depicts a testing environment for testing multiple DUTs in parallel in accordance with another exemplary embodiment of the presently claimed invention.

Referring to FIG. 3, in accordance with another exemplary embodiment, following the synchronization time interval 207a, the tester 100 can perform a transmit test 209t in which the replicated VSG signals 113a, 113b, 113c contain TDD data packets, in response to which the DUTs 200a, 200b, 200c return duplicates of such data packets, i.e., loop-back data packets.

Figure 4:
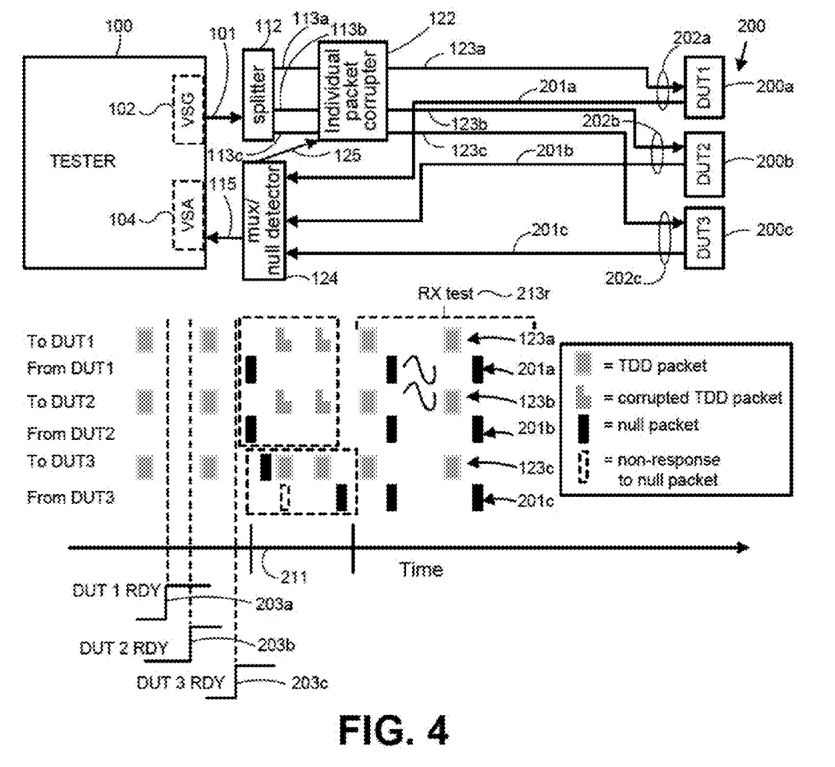
FIG. 4 depicts a testing environment for testing multiple DUTs in parallel in accordance with another exemplary embodiment of the presently claimed invention.

Referring to FIG. 4, in accordance with another exemplary embodiment, the signal routing circuitry 124 in the receive path for the VSA 104 of the tester 100 includes null signal detection circuitry (e.g., in addition to the multiplexing circuitry) which detects the presence of null data packets in the return signals 201a, 201b, 201c from the DUTs 200a, 200b, 200c. When a null data packet is detected, one or more control signals 125 to the signal characteristic control circuitry 122 in the transmit path (discussed in more detail below) cause such circuitry 122 to alter one or more signal characteristics of the replicated VSG signals 123a, 123b, 123c. For example, as shown for time interval 211, two of the DUTs 200a, 200b have become ready for testing 203a, 203b and respond by transmitting null data packets as part of their return signals 201a, 201b. These null data packets are detected by the null detection circuitry within the return signal routing circuitry 124 and the one or more control signals 125 cause the signal characteristic control circuitry 122 to corrupt the corresponding replicated VSG control signals 123a, 123b, e.g., by reducing signal power during the data packet interval.

Meanwhile, the third DUT 200c, now ready for testing 203c, initially receives a null data packet signal from one of the other DUTs 203a, 203b that had been transmitted to indicate its readiness for testing. However, since the other DUTS 203a, 203b are no longer receiving valid, e.g., non-corrupted, data packet signals, they no longer transmit null data packets in return. As a result, the third DUT 200c now begins receiving valid test data packets 123c and responds accordingly with null data packets 201c. Following this time interval 211, the tester can then perform a receive test 213r in which predefined test data packets 123a, 123b, 123c can be transmitted for reception by the DUTs 200, in response to which the DUTs 200 transmit null data packet signals 201, 201b, 201c.

Figure 5:
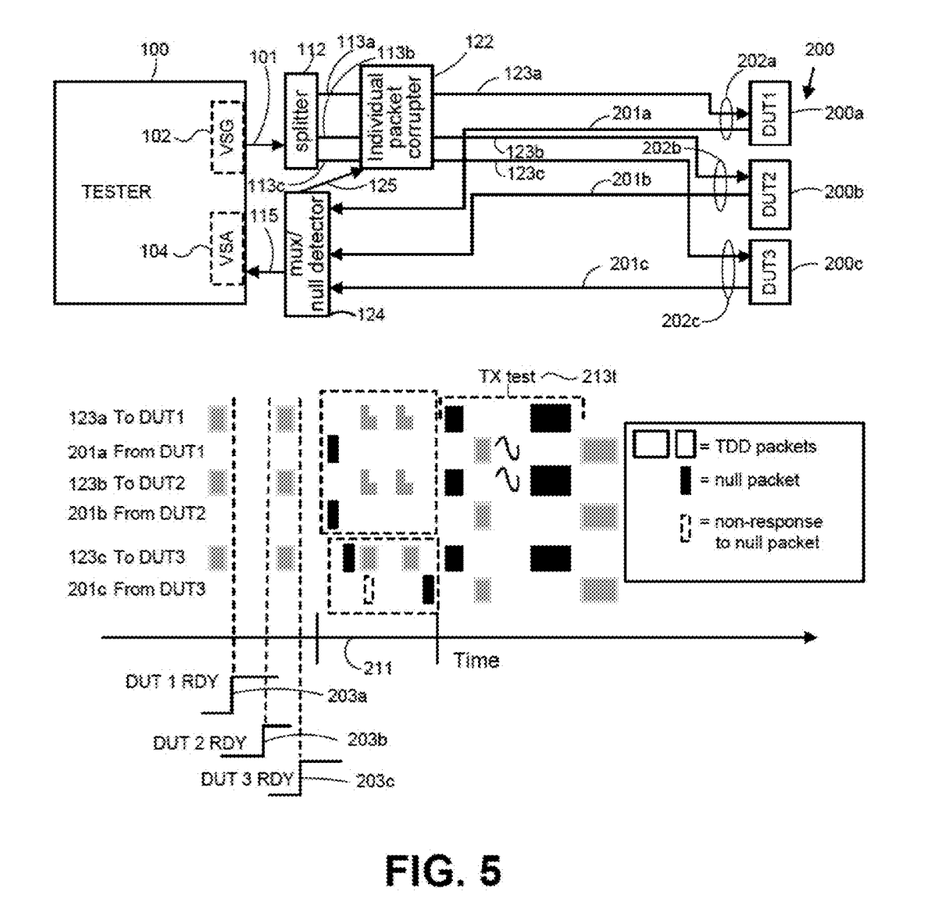
FIG. 5 depicts a testing environment for testing multiple DUTs in parallel in accordance with another exemplary embodiment of the presently claimed invention.

Referring to FIG. 5, in accordance with another exemplary embodiment, following the time interval 211 in which synchronization occurs, the tester 100 can perform a transmit test 213t in which replicated test data packets 123a, 123b, 123c can be transmitted, duplicated within the DUTs 200a, 200b, 200c and returned as their responsive signals 201a, 201b, 201c, i.e., as loop-back data packet signals.

Figure 6:
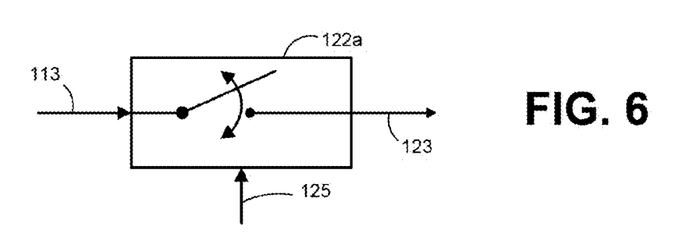
FIG. 6 depicts an exemplary embodiment of the signal characteristic control circuitry of FIGS. 4 and 5.

Referring to FIG. 6, in accordance with an exemplary embodiment, corruption of the replicated data packet signal 113 can be achieved by switching open the signal path using a switch 122a in accordance with a control signal 125 to significantly reduce the signal power of the replicated data packet signal 123.

Figure 7:
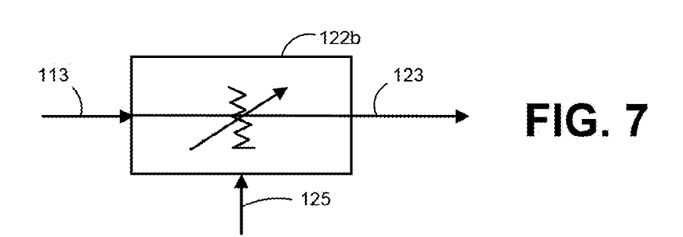
FIG. 7 depicts another exemplary embodiment of the signal characteristic control circuitry of FIGS. 4 and 5.

Referring to FIG. 7, in accordance with another exemplary embodiment, corruption of the data packet signal 113 can be achieved using a programmable signal attenuator 122b. In accordance with the control signal 125, signal attenuation can be increased such that the signal power of the replicated data packet signal 123 is reduced below a threshold value necessary for the signal to be deemed to be in conformance with the applicable signal standard.

Figure 8:
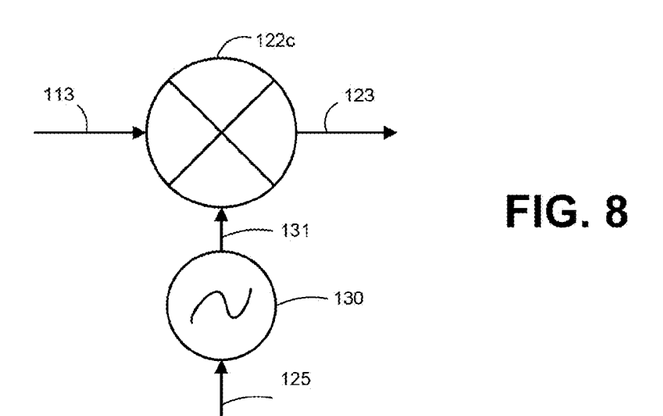
FIG. 8 depicts another exemplary embodiment of the signal characteristic control circuitry of FIGS. 4 and 5.

Referring to FIG. 8, in accordance with another exemplary embodiment, instead of switching 122a or attenuation 122b circuitry, signal mixing circuitry 122c can be used. Corruption of the data packet signal 113 is achieved by altering the frequency of the replicated data packet signal 123 by mixing it with another radio frequency (RF) signal 131 from a local RF signal source 130 controlled by a control signal 125.

Hence, it can be seen that signal corruption can be achieved by altering virtually any data packet signal characteristic, including signal power and signal frequency.

Figure 9:
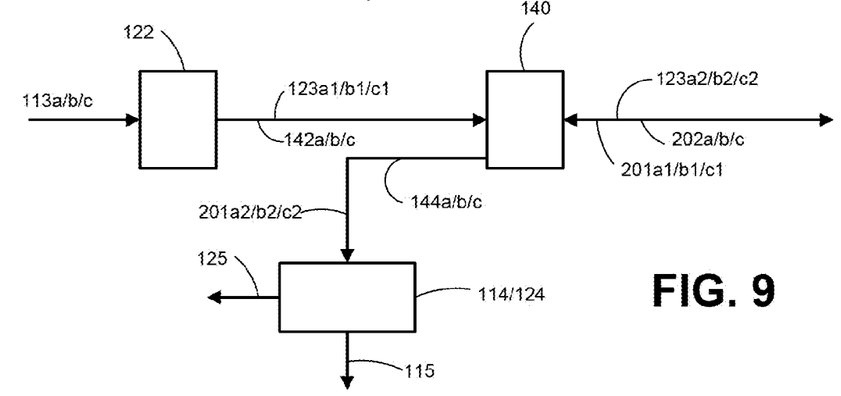
FIG. 9 depicts circuitry for conveying test signals to and confirmation signals from the DUTs in accordance with an exemplary embodiment of the presently claimed invention.

Referring to FIG. 9, in accordance with exemplary embodiments of the presently claimed invention, the wired signal paths for testing the DUTs 200 are typically in the form single wired connection for each DUT 200a, 200b, 200c, as noted above. For example, for the first DUT 200a, the test data packet signal 123a2 and return null data packet signal 201a1 are conveyed via a shared, or common, wired signal path 202a. (Similarly, the test data packet signals 123b2, 123c2 to and responsive null data packet signals 201b1, 201c1 from the remaining DUTs 200b, 200c are conveyed via respective shared wire signal paths 202b, 202c.) Each of the replicated VSG signals 123a1, 123b1, 123c1 from the data corruption circuitry 122 is conveyed via a respective wired signal path 142a, 142b, 142c to additional signal routing circuitry 140 (discussed in more detail below) to be conveyed over the wired DUT signal paths 202a, 202b, 202c as the respective replicated VGA signals 123a2, 123b2, 123c2. The responsive null data packet signals 201a1, 201b1, 201c1 are conveyed in return via the wired DUT signal paths 202a, 202b, 202c to the routing circuitry 140 for conveyance via a respective output signal path 144a, 144b, 144c to the null detection and multiplexing circuitry 124.

The additional signal routing circuitry 140 can be implemented in a variety of forms, in accordance with techniques well known in the art. For example, such routing circuitry 140 can be implemented as a 1:2 signal divider, or splitter, in which case the responsive null data packet signals 201a1, 201b1, 201c1 are divided and provided via the corresponding output signal path 144a, 144b, 144c as lower powered versions 201a2, 201b2, 201c2 of the original null data packet signals. Alternatively, such routing circuitry 140 can be implemented as a signal coupler providing a coupled version of the responsive null data packet signals 201a1, 201b1, 201c1 at the corresponding output signal port 144a, 144b, 144c. Further alternatively, such routing circuitry 140 can be implemented as a signal switch controlled in accordance with a control signal (not shown) from the tester 100 or an external controller (not shown) such that, during transmission of the replicated VSG test signals 123a1, 123b1, 123c1, corresponding signal paths 142a, 142b, 142c and 202a, 202b, 202c are connected. Similarly, during the time intervals in which the DUTs 200 are expected to respond, corresponding signal paths 202a, 202b, 202c and 144a, 144b, 144c are connected.

Based upon the discussion above, it can be seen that when simultaneously testing TDD devices, there is a possibility that one or more TDD devices will start at such time relative to the other TDD devices as to improperly synchronize to another TDD device response data packet rather than a tester test data packet. Typically, multiple DUTs will not become synchronized at the same time once a test process begins. Therefore, when the replicated test data packets are transmitted, the DUTs ready for testing will respond with null data packet signals, while those that are not yet ready for testing will not respond until they become ready. Transmitting test data packets before a DUT is ready may be done during bit error ratio (BER) testing where one need only test a minimum number of bits, in which case, sending more data packets to some DUTs than others is not critical so long as the DUT receiving the smallest number of bits receives the minimum number of bits required for test purposes. However, it is possible that a DUT becomes ready after the tester has sent its set of data packet signals, in which case, instead of receiving a tester data packet, the now-ready DUT receives leaked null data packet signal sent by another DUT. Meanwhile, the tester will have no way of knowing that this has occurred. Hence, as the tester continues to send its predefined test data packets to the multiple DUTs, the properly synchronized DUTs will receive those test data packets, while those that have not been properly synchronized will not.

With reference to FIGS. 2 and 3, in accordance with these exemplary embodiments, the tester sends null data packets at the beginning of the test sequence. The DUTs will not respond to those null data packets. The tester continues to send null data packets until the synchronization time interval has elapsed. This interval is chosen such that properly operating DUTs will be ready before it elapses. During that time interval, since the tester is sending null data packets, the DUTs are sending no responses. Therefore, no leaked response data packets can cause another DUT to erroneously synchronize to them.

With reference to FIGS. 4 and 5, in accordance with these other exemplary embodiments, a shorter test time can be achieved because the synchronization time period is dynamic rather than static, or fixed. As discussed above, as the tester transmits replicated test data packets, the DUTs that become ready for testing respond by transmitting null data packet signals. These responsive null data packet signals are detected and the corresponding DUTs are identified, following which, subsequent transmissions of the corresponding replicated test data packet signals will be altered, e.g., corrupted, so as to not be in conformance with the applicable signal standard. The DUTs receiving such corrupted signals will no longer send responsive null data packet signals thereby preventing an erroneous synchronization of a DUT not yet ready for testing to a responsive null data packet signal instead of a replicated VSG signal.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of facilitating testing of multiple time-division-duplex (TDD) data packet signal transceivers, comprising:

providing a plurality of outgoing data packet signals for a plurality of TDD data packet signal transceivers, wherein each one of said plurality of outgoing data packet signals corresponds to a common data packet signal comprising at least one of a null data packet signal, and a TDD data packet signal with a data packet signal characteristic;

when said common data packet signal comprises a null data packet signal, continuing to provide said plurality of outgoing data packet signals for a predetermined time interval; and when said common data packet signal comprises a TDD data packet signal, responding to successful and unsuccessful receptions of respective ones of a plurality of responsive signals from said plurality of TDD data packet signal transceivers by providing one or more of said plurality of outgoing data packet signals, wherein each one of said plurality of responsive signals is indicative of a successful reception of a valid data packet by a corresponding one of said plurality of TDD data packet signal transceivers, and following a successful reception of one of said plurality of responsive signals from a corresponding one of said plurality of TDD data packet signal transceivers, a corresponding one of said plurality of outgoing data packet signals is provided with said data packet signal characteristic such that said corresponding one of said plurality of outgoing data packet signals fails to conform with a predetermined data packet signal standard, and following an unsuccessful reception of one of said plurality of responsive signals from a corresponding one of said plurality of TDD data packet signal transceivers, a corresponding one of said plurality of outgoing data packet signals is provided with said data packet signal characteristic such that said corresponding one of said plurality of outgoing data packet signals conforms with said predetermined data packet signal standard.

2. The method of claim 1, further comprising, when said common data packet signal comprises a null data packet signal, receiving, during at least a portion of said predetermined time interval in response to said plurality of outgoing data packet signals, corresponding responsive signals from one or more of said plurality of TDD data packet signal transceivers.

3. The method of claim 1, wherein following a successful reception of one of said plurality of responsive signals from a corresponding one of said plurality of TDD data packet signal transceivers, a corresponding one of said plurality of outgoing data packet signals is provided with said data packet signal characteristic such that:
- a first portion of said corresponding one of said plurality of outgoing data packet signals conforms with said predetermined data packet signal standard; and
- a second portion of said corresponding one of said plurality of outgoing data packet signals fails to conform with said predetermined data packet signal standard.

4. The method of claim 3, wherein said second portion is subsequent to said first portion.

5. The method of claim 1, wherein said data packet signal characteristic comprises at least one of signal power and signal frequency.

6. The method of claim 1, wherein said providing a plurality of outgoing data packet corresponding to a common data packet signal comprises dividing a signal power of said incoming data packet signal to provide a plurality of replica data packet signals.

7. The method of claim 6, wherein said providing a plurality of outgoing data packet corresponding to a common data packet signal further comprises attenuating one or more of said plurality of replica data packet signals to provide said plurality of outgoing data packet signals.

8. The method of claim 6, wherein said providing a plurality of outgoing data packet corresponding to a common data packet signal further comprises switching one or more of said plurality of replica data packet signals to provide said plurality of outgoing data packet signals.

9. The method of claim 6, wherein said providing a plurality of outgoing data packet corresponding to a common data packet signal further comprises mixing one or more of said plurality of replica data packet signals with one or more radio frequency (RF) signals to provide said plurality of outgoing data packet signals.

10. The method of claim 1, further comprising exchanging respective pluralities of test data packet signals and responsive data packet signals with said plurality of DUTs following:
- said predetermined time interval when said common data packet signal comprises a null data packet signal; and
- successful reception of one of said plurality of responsive confirmation signals from each one of said plurality of TDD data packet signal transceivers when said common data packet signal comprises a TDD data packet signal.

* * * * *